REFRIGERATING APPARATUS INCLUDING SUPPLEMENTAL REFRIGERATING MEANS

Filed April 7, 1958

Inventor:
John Roeder Jr.,
By Schroeder, Hofgren, Brady & Wegner, Attys.

2,964,912
Patented Dec. 20, 1960

2,964,912

REFRIGERATING APPARATUS INCLUDING SUPPLEMENTAL REFRIGERATING MEANS

John Roeder, Jr., Benton Harbor, Mich., assignor to Whirlpool Corporation, a corporation of Delaware Filed Apr. 7, 1958, Ser. No. 726,910

4 Claims. (Cl. 62—3)

This invention relates to a refrigerating apparatus.

The invention here is concerned with providing a supplemental refrigerated chamber in combination with a refrigerated enclosure in which the supplemental chamber is cooled by refrigerating means having a heat absorber exposed to the chamber and a heat dissipator exposed to the refrigerated enclosure so that heat will be pumped from the relatively small chamber into the refrigerated enclosure. By this means the small chamber is maintained at a substantially uniformly cold temperature and can be isolated from the remainder of the refrigerated space.

One of the features of this invention is to provide an improved refrigerating apparatus comprising a refrigerated enclosure adapted to contain heat perishable items, a relatively small chamber, and supplemental refrigerating means having a heat absorber exposed to said chamber for cooling the chamber and a heat dissipator exposed to said enclosure for cooling the dissipator.

Another feature is to provide an improved apparatus comprising a refrigerated enclosure adapted to contain heat perishable items and including a movable door thereon movable about a hinge; a relatively small chamber in said door and including a movable chamber door on the side of the chamber normally adjacent to said enclosure movable about a hinge, thermoelectric refrigerating means having a plurality of heat absorbers exposed to said chamber for cooling the chamber and a plurality of heat dissipators exposed to said enclosure for cooling the dissipators, the thermoelectric refrigerating means being located in said chamber door, and power leads to said thermoelectric means extending adjacent to both said hinges.

Other features and advantages of the invention will be apparent from the embodiment thereof shown in the accompanying drawings. Of the drawings.

Figure 1:
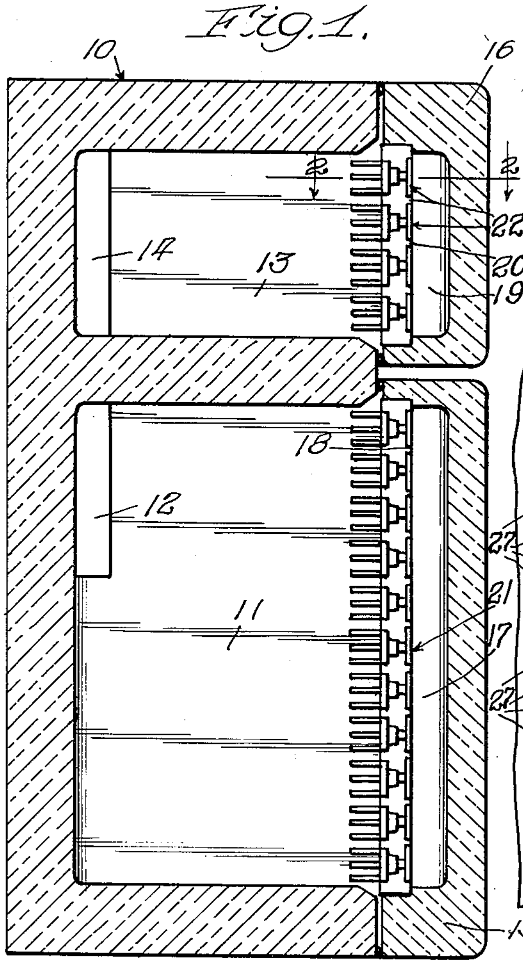
Figure 1 is a semi-diagrammatic vertical section through an apparatus embodying the invention.

The apparatus of this invention includes a refrigerator 10 having a lower compartment 11 adapted to be cooled by a conventional refrigerating device indicated at 12, an upper frozen goods compartment 13 adapted to be cooled by a conventional refrigerating device 14 and doors 15 and 16 on the respective compartments.

Forming a part of the door 15 is an inner chamber 17 normally closed by a door 18. Located in the upper door 16 is a similar chamber 19 also normally closed by a door 20.

In order to cool each of the chambers 17 and 19 a thermoelectric panel 21 and 22 is provided as a part of the respective chamber doors 17 and 19. These thermoelectric panels are essentially the same and one such panel 22 is shown in greater detail in Figure 2 and diagrammatically in 3.

Figure 3:
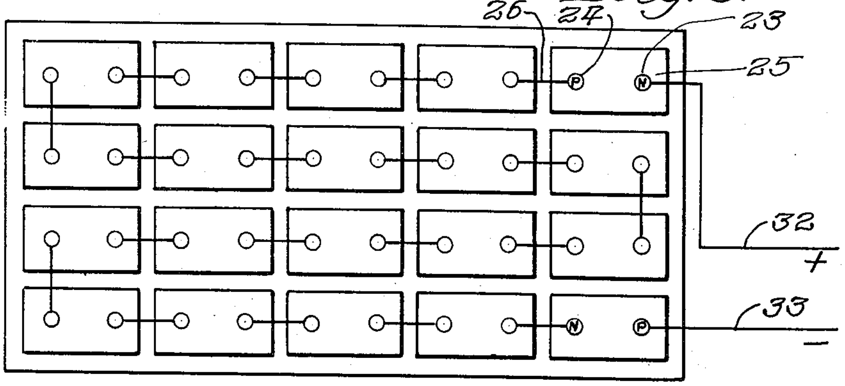
Figure 3 is a diagrammatic view of a thermo-electric circuit of the embodiment of Figures 1 and 2.

Typical thermoelectric panels are disclosed in M. K. Baer et al application Serial No. 735,804, filed May 16, 1958. Panel 22 is made up of a series of Peltier couples arranged in electrical series as indicated in Figure 3. Each couple includes an N type thermoelectric element 23 and a P type thermoelectric element 24. These elements are connected in electrical series to a source of thermoelectric power in the manner illustrated in Figure 3. Each thermoelectric couple is mounted on a small metal panel 25 and these operate as cold junctions when the current is caused to flow as indicated in Figure 3. These cold junctions 25 are adjacent to the chamber 19 in order to cool the chamber. The P element 24 of each couple is connected to the N element of the next couple by means of a metal connector 26. These connectors are in the form of metal strips and function as hot junctions. Each hot junction is provided with a plurality of spaced heat transfer vanes 27 that are located in heat conducting relationship with the atmosphere in the refrigerated compartment 13 when the door 16 is closed. Thus, with each panel 21 and 22 the series of thermoelectric couples serves to pump heat from the small chamber 19 into the refrigerated compartment 13. A similar effect, of course, is achieved between the chamber 17 and the compartment 11. If desired, the cold junctions or heat absorber panels 25 may also be provided with heat absorbing fins as indicated at 28.

Each chamber door 18 and 20 is mounted on a hinge structure. One such hinge structure 29 for the door 20 is shown in detail in Figure 2. The door makes sealing contact with a conventional gasket 30.

Figure 2:
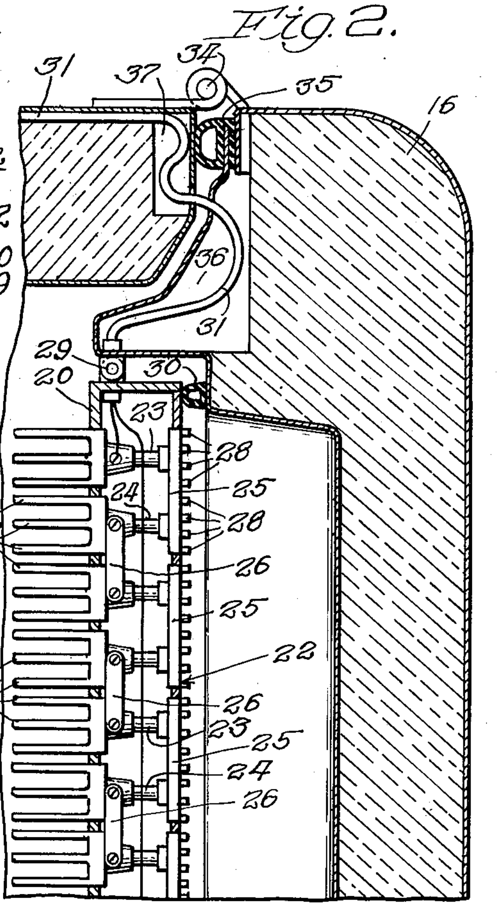
Figure 2 is a fragmentary enlarged horizontal section taken substantially along line 2—2 of Figure 1.

In order to supply thermoelectric power, each panel 21 and 22 is connected to a source of direct current by means of a cable 31. Each cable has a pair of electric leads 32 and 33 electrically connected to the panel as indicated in Figure 3. In order to minimize wear on the cable when the refrigerator doors such as the door 16 and the chamber doors such as the door 20 are opened and closed, the cables are located adjacent to the hinges. Thus, as is shown in Figure 2, the cable 31 passes adjacent to the hinge 29 for the chamber door 20. It also passes adjacent to the hinge 34 for the door 16. This door is sealed to the refrigerator casing by means of a conventional gasket 35.

In the embodiment shown, the cable 31 extends through a chamber 36 in the door 16 and a chamber 37 in the refrigerator wall with both chambers being adjacent to the hinges 29 and 34. When the doors are closed there will be excess cable in these two chambers as indicated in Figure 2. However when the door 16 is opened fully, this excess will then be taken up. The provision of the excess cable in these two chambers is to prevent excessive stress on the cable when the door is opened and closed.

As can be seen from the above description, the refrigerating apparatus of this invention provides refrigerating means supplemental to the main refrigerating means to refrigerate the small chambers such as the chambers located in refrigerator doors. This is done quite easily and efficiently with the present invention as it is only necessary to pass a relatively small electric cable into the doors to supply refrigerating power to the refrigerating means. With conventional refrigeration of the compressor-expander type this has not been commercially feasible. The reason is that if a conventional refrigerator system were used in a door of the refrigerator, it would be necessary to employ at least two flexible tubes to carry the refrigerant to and from the ordinary evaporator in the door. Not only would such tubes and their necessary associated structure be cumbersome, but there would also be great danger that repeated opening and closing of the doors would rupture one or both of the tubes in a relatively short time.

Another advantage of the present system is that the usual refrigerated compartment or compartments of the refrigerator is used to cool the heat dissipators of the couples. This results in the couples operating under a smaller temperature difference so that the coefficient of performance of the couples is raised.

Another very important advantage is that the doors 18 and 20 to the small chambers 17 and 19 in the doors are normally kept closed except when it is desired to insert or remove articles such as food from the chambers. As is well known when a conventional refrigerator door is opened food stored in shelves of the inner side of the door is immediately warmed as the food storage shelves are then exposed to the outside atmosphere. This of course does not occur in the structure of this invention.

In order to simplify the illustrated embodiment shelves and other storage facilities have not been shown in either the upper or lower compartments 11 and 13 or in the door chambers 17 and 19. It is of course understood that any such storage facilities required can be provided as desired.

Having described my invention as related to the embodiments shown in the accompanying drawings, it is my intention that the invention be not limited by any of the details of description, unless otherwise specified, but rather be construed broadly within its spirit and scope as set out in the accompanying claims.

I claim:

1. Refrigerating apparatus comprising: an enclosure defining a first chamber adapted to contain heat perishable items; means for refrigerating said first chamber; a relatively small, second chamber; and thermoelectric refrigerating means having a plurality of heat absorbers exposed to said second chamber for cooling the second chamber and a plurality of heat dissipators exposed to said first chamber for cooling the dissipators.

2. Refrigerating apparatus comprising: an enclosure defining a first chamber adapted to contain heat perishable items and including a movable door thereon movable about a hinge forming an axis of movement for the door; means for refrigerating said first chamber; a relatively small, second chamber in said door; and supplemental refrigerating means having a heat absorber exposed to said second chamber for cooling the second chamber independently of the first chamber and a heat dissipator exposed to said first chamber for cooling the dissipator, a portion of said supplemental refrigerating means extending into said second chamber from the first chamber in the vicinity of said hinge axis to minimize bending of said portion during door movement.

3. Refrigerating apparatus comprising: an enclosure defining a first chamber adapted to contain heat perishable items and including a movable door thereon movable about a hinge forming an axis of movement for the door; means for refrigerating said first chamber; a relatively small, second chamber in said door; and thermoelectric refrigerating means having a plurality of heat absorbers exposed to said second chamber for cooling the second chamber and a plurality of heat dissipators exposed to said first chamber for cooling the dissipators when the door is closed, and power leads to said means, the power leads being located adjacent to said hinge axis to minimize bending of the leads during door movement.

4. Refrigerating apparatus comprising: an enclosure defining a first chamber adapted to contain heat perishable items and including a movable door thereon movable about a hinge forming an axis of movement for the door; means for refrigerating said first chamber; a relatively small, second chamber in said door and including a movable chamber door on the side of the second chamber normally adjacent to said first chamber movable about a hinge forming an axis of movement for the door; thermoelectric refrigerating means having a plurality of heat absorbers exposed to said second chamber for cooling the second chamber and a plurality of heat dissipators exposed to said first chamber for cooling the dissipators, the thermoelectric refrigerating means being located in said second chamber door; and power leads to said thermoelectric means extending adjacent to the axis of both said hinges to minimize bending of the leads during door movement.

References Cited in the file of this patent

UNITED STATES PATENTS

| | | |
|---|---|---|
| 1,818,437 | Stuart | Aug. 11, 1931 |
| 2,401,460 | Charland | June 4, 1946 |
| 2,721,454 | Levey | Oct. 25, 1955 |
| 2,728,199 | Kurtz | Dec. 27, 1955 |
| 2,844,638 | Lindenblad | July 22, 1958 |
| 2,872,788 | Lindenblad | Feb. 10, 1959 |